Sept. 2, 1952        A. L. MISHLER        2,608,780

PATTERN ROLL TABLE

Filed Aug. 10, 1948        2 SHEETS—SHEET 1

INVENTOR.
ARCHIE L. MISHLER

BY *Cook and Schermerhorn*

ATTORNEYS

Sept. 2, 1952 — A. L. MISHLER — 2,608,780
PATTERN ROLL TABLE
Filed Aug. 10, 1948 — 2 SHEETS—SHEET 2

INVENTOR.
ARCHIE L. MISHLER
BY Cook and Schermerhorn
ATTORNEYS

Patented Sept. 2, 1952

2,608,780

UNITED STATES PATENT OFFICE 2,608,780

PATTERN ROLL TABLE

Archie L. Mishler, Portland, Oreg.; F. Brock Miller trustee of the estate of said Archie L. Mishler, bankrupt Application August 10, 1948, Serial No. 43,460

10 Claims. (Cl. 40—86)

This invention relates to a device for presenting portions of a roll of paper against the underside of a flat, transparent surface for the purpose of tracing patterns or other figures from the paper.

Although the device of the invention may also be used for viewing or tracing any kind of drawings, designs, pictures or other markings on a roll of paper, it will be described in use with a roll of auto glass patterns to facilitate the cutting of glass for a great variety of sizes and styles of automobile windows. Heretofore such patterns have been printed on separate sheets which entail a considerable problem in indexing and storing the sheets to be available for frequent use, considering the great number of such sheets required to provide patterns for all the windows of the different makes and models of automobiles which may need replacement glass over a period of years.

Objects of the present invention are to provide a novel pattern roll table in which all the patterns or the like are printed on a single, long rolled sheet of paper which may be unrolled to present the desired pattern or group of patterns to view in a convenient position, to provide a roll table of the type described having a transparent top surface on which the window glass may be supported for scoring or cutting directly above the pattern so that the outline of the pattern may be accurately followed by the scoring tool, to provide a roll table having a pair of rolls arranged at opposite ends of a transparent top surface to pass the pattern sheet from one roll to the other therebeneath by merely turning a crank to rotate the rolls, to provide elevating means for pressing the pattern sheet flat against the underside of the transparent top surface, to provide a novel brake means to stop the rotation of the rolls when the desired pattern is located, and to provide a novel mechanism for controlling and coordinating the operation of the elevating and braking means by simple manual manipulation.

Still further objects and advantages will become apparent and the invention will be better understood with reference to the following description of the preferred embodiment of the invention shown in the accompanying drawings. It is to be understood, however, that the drawings are for the purpose of illustration only and not for the purpose of limiting the invention, as various changes may be made in the construction and arrangement of parts, and all such modifications within the scope of the appended claims are included in the invention.

The present roll table comprises in general a box or cabinet structure having means at its opposite ends for mounting spools for the roll of pattern paper. Cranks are provided for rotating the rolls to wind the paper from one spool to the other to present sections of the paper containing selected patterns to view beneath a transparent top surface extending between the spools. Between the two spools the paper passes over a platen which may be elevated to press the paper flat against the underside of the transparent top surface, and brake mechanisms are provided to stop the rotation of the spools when the platen is thus elevated. When the device is used for window glass patterns and the like, the transparent surface across the top of the box provides a supporting surface for the glass which is to be cut, whereby the device serves as a work table for scoring the glass plates as well as a container and storage space for all the patterns. Since the patterns remain enclosed within the cabinet at all times and are not handled at any time, they are kept clean and in good condition regardless of the amount of use.

Figure 1:
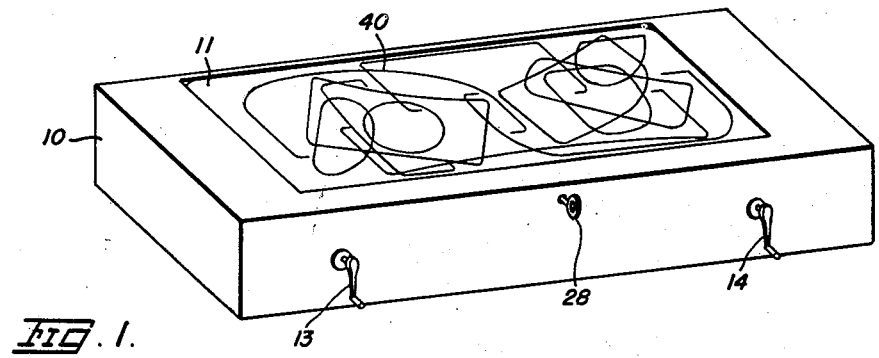
Figure 1 is a perspective view of the top and front side of the roll table.

Referring now to the drawings, Figure 1 shows a perspective view of the device equipped with a roll of auto glass patterns. The pattern roll and working parts are housed within a generally rectangular cabinet 10 having a transparent top surface 11 forming a window through which the patterns may be viewed and constituting a working and supporting surface for the glass to be cut. Within the cabinet at its opposite ends are mounted a pair of spools 12 for the roll of patterns. In the use of the device, the long sheet of paper containing the patterns may be wound back and forth from one spool to the other to place the desired pattern or group of patterns in view beneath the transparent top 11. The spools are rotated on shafts 12a by cranks 13 and 14 by suitable means such as the chain and sprocket drive 13a shown in Figure 7 wherein the driving ratio is such as to cause the driven spool to rotate considerably faster than the crank to facilitate the rapid winding or unwinding of the roll when it is necessary to turn through a considerable length of paper to locate the desired pattern. The patterns may be numbered or otherwise indexed to indicate when the desired pattern is about to come into view, and when it appears beneath the transparent top 11 the elevating and braking mechanism is operated to press the pattern against the transparent top 11 and stop the spinning of the spools. Suitable provision is made for inserting the spools 12 in the cabinet in driving engagement with the shafts 12a.

Figure 2:
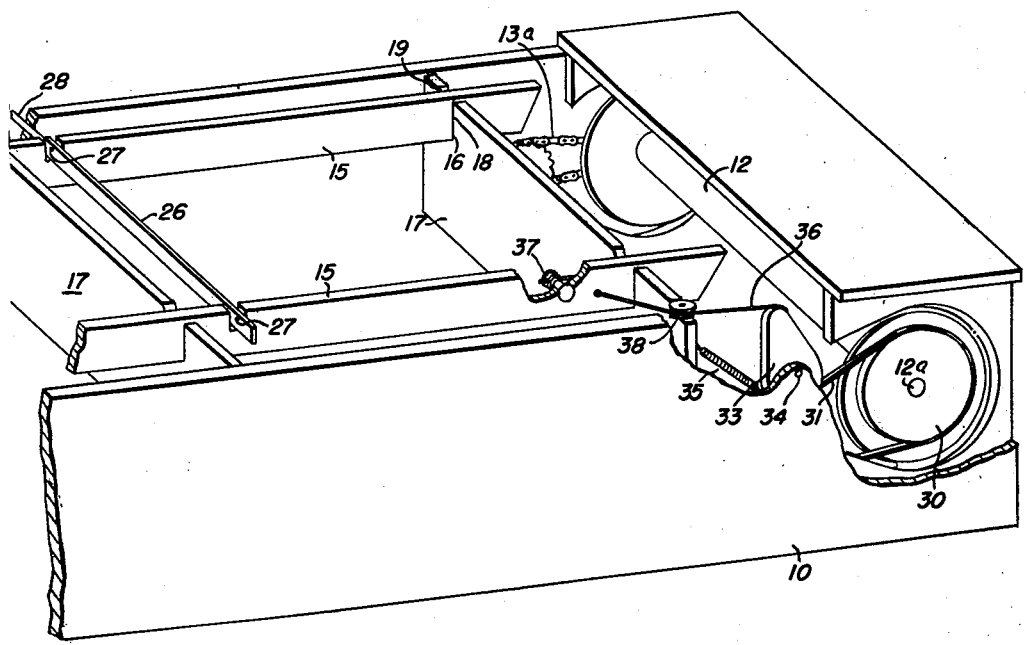
Figure 2 is an enlarged fragmentary perspective view of the rear side of the roll table with certain parts removed and other parts broken away to show the elevator and brake mechanism.
Figure 4:
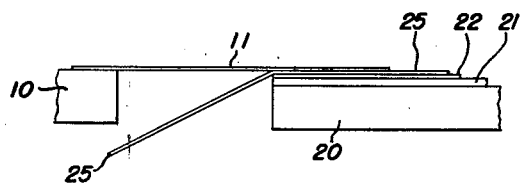
Figure 4 is a fragmentary sectional view showing the manner in which the portion of the pattern sheet in use is supported and pressed flat against the underside of the transparent top.
Figure 3:
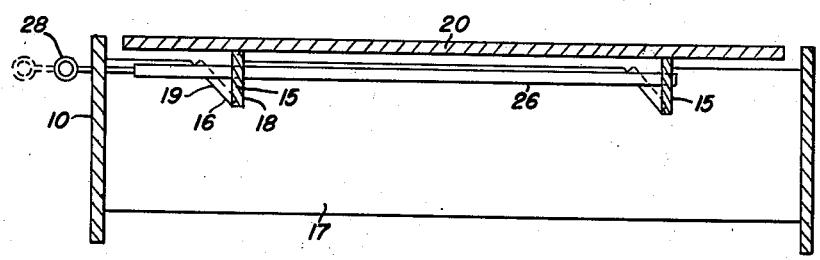
Figure 3 is a cross sectional view of the table showing the elevator mechanism for the platen in raised position.
Figures 3A, 7:
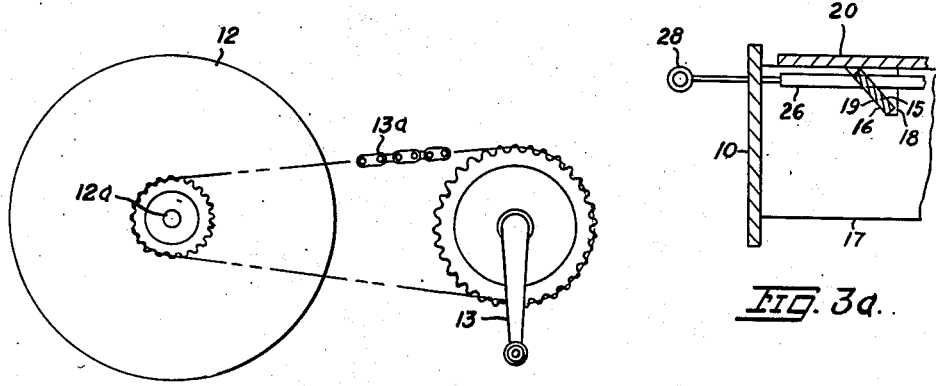
Figure 3a is a fragmentary view similar to Figure 3 but showing the platen in its lower position.
Figure 7 is a view of the driving arrangement for one of the rolls.

The elevating mechanism comprises a plurality of slat-like members 15 resting loosely on edge in V-notches 16 in a pair of stationary upright transverse members 17 extending across the cabinet as shown in Figures 2 and 3. Each notch 16 has a vertical side 18 and an inclined side 19, and the notches are of such depth that when the strips 15 are tilted over against the inclined sides of the notches they are wholly contained within the notches, as shown in Figure 3a and in broken lines in Figure 3, but when the strips 15 are pushed up to vertical positions against the vertical sides 18 of the notches, the upper edges of the strips rise above the upper edges of the members 17 to lift the platen 20 as shown in full lines in Figure 3. The platen 20 is preferably covered with a felt pad 21 and layer of paper 22 to provide a smooth cushion over which the pattern sheet 25 may slide freely when one of the cranks is turned. When the strips 15 are tilted to their inclined positions as shown in Figure 3a, the platen 20 rests directly on the members 17 allowing ample clearance between the paper cover 22 of the platen and the transparent top 11 for the passage of the pattern sheet 25. When the strips 15 are raised to their vertical positions shown in full lines in Figure 3, the platen 20 raises the pattern sheet 25 into contact with the underside of the transparent top 11, as shown in Figure 4, to form a solid support for the glass to be scored, or other work piece, without depending on the strength of the transparent top 11. The top 11 may therefore be made of an inexpensive and unbreakable flexible transparent material, since it is not required in itself to furnish any supporting strength. In Figure 2 both the top 11 and platen 20 are not shown, while in Figures 3 and 3a the platen is included and the top 11 is omitted.

The strips 15 are moved to upright position in their notches 16 to elevate the platen 20 by means of a push rod 26 pivotally connected with each strip at 27. The push rod 26 has a handle 28 extending through the front side of the cabinet in a convenient position. The notches 16 preferably have flat, horizontal bottoms so that when the strips 15 are pushed into upright position to elevate the platen, they will tend to remain in that position until such time as the handle 28 is pulled outwardly.

The brake mechanism for the rolls and spools comprises a brake drum 30 mounted on each roll supporting shaft 12a to turn with the roll. A brake band 31 is trained around the brake drum 30 with one end anchored at 32 and the other end secured to a brake lever 33 which is pivotally mounted at 34. The brake is applied by a spring 35 connected with the lever 33 to tighten the band 31 when the lever 33 is otherwise released to respond to spring action.

Figures 5, 6:
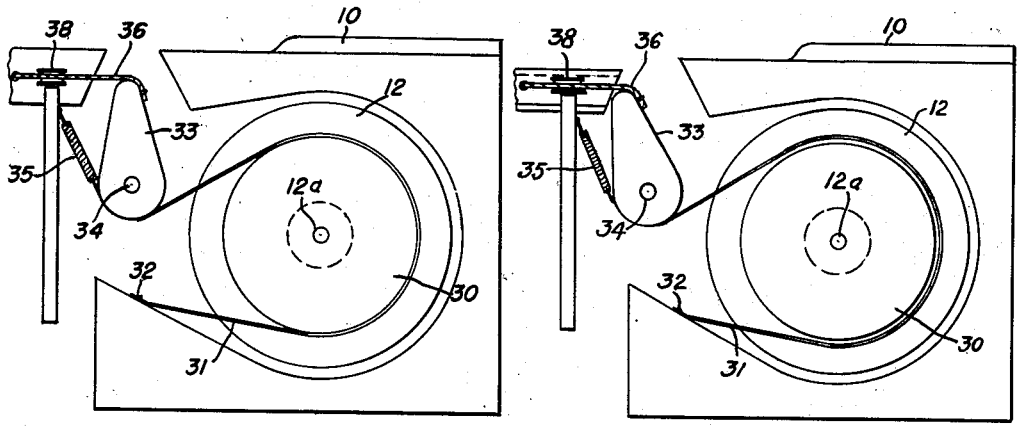
Figure 5 is an elevation view of one of the brake mechanisms with the brake applied.
Figure 6 is a view of the brake mechanism with the brake released.

A cable 36 is attached at one end to the lever 33 and at its other end to a bolt 37 in one of the strips 15, the end of the cable passing through a hole in the bolt and being clamped in adjusted position between two nuts as shown. The cable is trained around the pulley 38 so that the action of the brake will be coordinated with the elevator mechanism. When the handle 28 is pushed in to elevate the platen 20, the movement of the strips 15 to upright position slacks the cable 36 allowing the spring 35 to tighten the brake band and stop rotation of the roll, as shown in Figure 5. When the handle 28 is pulled out to lower the platen, the brake lever 33 is rocked in a counterclockwise direction as shown in Figure 6 to stretch the spring and release the tension on the brake band. It is understood that the shaft for the other spool (not shown) is also provided with a brake mechanism of the type just described so that both spools are stopped at the same time whenever the platen is raised.

If desired, the springs 35 may be made sufficiently strong to pull the strips 15 into upright position and hold them there to prevent accidental rotation of the spools or crank handles at all times when the mechanism is not in use. With such springs, the handle 28 would of course have to be held in its outer position in order to turn either of the cranks to select a new pattern. Such an arrangement has the advantage of holding the pattern sheet taut between the two spools and preventing accidental movement of the cranks which would loosen the paper in the rolls. However, it may be desired for certain uses to provide friction or other latching means for the handle 28 to hold it in either extended or retracted position. For the present purpose it is preferred to use springs which will operate the brakes without moving the strips 15 so that the latter will remain in either vertical or inclined positions as adjusted by the handle 28.

In Figure 1 the numeral 40 designates a group of overlapping patterns on the sheet 25 visible simultaneously through the transparent top 11. Where it is necessary to provide a very large number of patterns, as in the case of patterns for automobile glass, it is convenient to overlap and group the patterns in this manner so that all the patterns which might be needed to replace the glass in a particular automobile would be presented to view at the same time without turning the rolls and so that the pattern sheet will not reach an excessive length. The individual patterns may be disposed in any other suitable arrangement on the sheet, however, and as hereinabove pointed out, the present apparatus may also be used to view or reproduce any other figures, designs or maps that may be contained on a roll of paper.

It is apparent that the crank 13 is connected with the spool in the left end of the cabinet in Figure 1 to pull the pattern sheet from right to left, and that the crank 14 is connected with the other spool to pull the pattern sheet in the opposite direction. These directions are reversed in Figure 2 showing the rear side of the cabinet. When the handle 28 is pushed in to elevate the platen 20 the brakes prevent both cranks from being turned.

Having now described my invention and in what manner the same may be used, what I claim as new and desire to protect by Letters Patent is:

1. In a pattern roll holder and the like, means for supporting a roll of pattern sheet for rotation, a transparent surface adjacent said roll supporting means, means to unwind said roll to present patterns on said sheet to view beneath said surface, means to elevate the portion of the sheet thus presented to view into contact with the underside of said surface, and brake means for said roll supporting means actuated by said elevating means to stop the rotation of said roll supporting means.

2. In a pattern roll holder and the like, spaced rotatable means for supporting two rolls containing a long sheet of material, a transparent surface between said rolls, means for winding said sheet from one roll to the other beneath said transparent surface, movable means to hold a portion of said sheet in contact with the underside of said surface, and brake means actuated by movement of said holding means to stop the rotation of said rolls.

3. In a pattern roll holder and the like, a rectangular transparent surface, means at opposite ends of said surface for supporting a pair of rolls for rotation, means for winding a long sheet from one roll to the other to pass beneath said transparent surface, elevator means for raising a portion of said sheet against the underside of said transparent surface, individual brake means for each of said rolls, and a common member for actuating said elevator means and said brake means to stop the rotation of both rolls when said elevator means is operated.

4. In a pattern roll holder and the like, a transparent surface, a platen beneath said surface, roll supporting means at opposite ends of said surface arranged to pass a long sheet from one roll to the other between said platen and said transparent surface, means for moving said platen and transparent surface together relatively to hold said sheet against the underside of said surface, brakes on said roll supporting means operable by said relative movement of means operable by said relative movement of said platen, and springs urging said brakes into braking position and urging said platen against said transparent surface.

5. In a pattern roll holder and the like, a flat horizontal transparent surface, a horizontal platen beneath said surface, a pair of rolls arranged to pass a long sheet from one roll to the other between said platen and said surface, means to turn said rolls to wind said sheet from one roll to the other, elevating means movable relative to said rolls to raise said platen against said surface, individual brake means on said rolls, and a common actuating means for said elevating means and said brake means to stop the rotation of said rolls when said platen is elevated.

6. In a pattern roll holder and the like, a flexible transparent surface, a flat platen beneath said surface, a pair of roll supporting means arranged to pass a long sheet of material between said platen and said transparent surface, means movable relative to said roll supporting means to raise said platen against said surface to support said surface, and brake means for said roll supporting means connected with said platen raising means to stop the rotation of said rolls when said platen is raised.

7. In a pattern table and the like, a cabinet having a transparent top surface and means for supporting a pair of pattern rolls for rotation in opposite ends of said cabinet to pass a sheet of patterns from one roll to the other beneath said transparent surface, a platen having vertical movement in said cabinet to press the unrolled portion of said sheet against said surface, and braking means actuated by movement of said platen for controlling the rotation of said rolls.

8. In a pattern table and the like, a cabinet having a transparent top surface, means for supporting a pair of pattern rolls for rotation in opposite ends of said cabinet to pass a sheet of patterns from one roll to the other beneath said transparent surface, a platen having vertical movement relative to said rolls to press the unrolled portion of said sheet against said transparent surface, means to raise said platen, and individual brakes for said rolls connected with said raising means to stop the rotation of both rolls when said platen is raised against said surface.

9. In a pattern table and the like, a cabinet having a flexible transparent top surface, supporting means for a pair of pattern rolls mounted in fixed positions in said cabinet at opposite ends of said surface, means to wind a pattern sheet from one roll to the other beneath said transparent surface, a flat, rigid platen disposed in a horizontal plane beneath said top surface and mounted for vertical movement relative to said roll supporting means, and means to raise said platen to press the unrolled portion of said sheet against said transparent surface and to provide support for objects placed on top of said surface.

10. In a device for presenting to view portions of a roll of sheet material, a pair of spaced rotatable roll supporting means, a transparent surface between said supporting means, means for winding said sheet from one roll to the other beneath said transparent surface, a platen mounted for movement relative to said roll supporting means to press a portion of said sheet against said transparent surface, means for imparting said relative movement to the platen, brake means to stop the rotation of said rolls, and means connected to both said brake means and said platen for simultaneously actuating the brake means and platen.

ARCHIE L. MISHLER.

REFERENCES CITED

The following references are of record in the file of this patent:

UNITED STATES PATENTS

| Number | Name | Date |
| --- | --- | --- |
| 729,847 | Collamore et al. | June 2, 1903 |
| 1,421,975 | Meyers | July 4, 1922 |
| 1,559,665 | Beery et al. | Nov. 3, 1925 |
| 2,097,592 | Gibbs | Nov. 2, 1937 |